(12) United States Patent
Clark (10) Patent No.: US 10,578,706 B2
(45) Date of Patent: Mar. 3, 2020

(54) WIRELESS SONAR RECEIVER

(71) Applicant: NAVICO HOLDING AS, Egersund (NO)

(72) Inventor: Jeremiah Clark, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 446 days.

(21) Appl. No.: 15/225,073

(22) Filed: Aug. 1, 2016

(65) Prior Publication Data

US 2017/0038460 A1 Feb. 9, 2017

Related U.S. Application Data

(60) Provisional application No. 62/201,816, filed on Aug. 6, 2015.

(51) Int. Cl.
*G01S 15/00* (2020.01)
*G01S 7/00* (2006.01)
(Continued)

(52) U.S. Cl.
CPC ............ *G01S 7/003* (2013.01); *G01S 7/6218* (2013.01); *G01S 7/6281* (2013.01); *G01S 15/86* (2020.01); *G01S 15/89* (2013.01); *G01S 15/96* (2013.01)

(58) Field of Classification Search
None
See application file for complete search history.

(56) References Cited

U.S. PATENT DOCUMENTS 3,341,697 A * 9/1967 Kaufman .................. G01S 1/72
434/7
3,610,798 A * 10/1971 Murphree ........... G01S 7/52004
434/6
(Continued)

FOREIGN PATENT DOCUMENTS

DE 29617813 U1 11/1996
EP 2602639 A1 6/2013
(Continued)

OTHER PUBLICATIONS

Smartcast RF15 Humminbird; http://www.smartcast-rf30.com/smartcast_rf10.htm ; retrieved Aug. 1, 2016; 2 pages.
(Continued)

*Primary Examiner* — Isam A Alsomiri
*Assistant Examiner* — Jonathan D Armstrong
(74) *Attorney, Agent, or Firm* — Nelson Mullins Riley & Scarborough LLP (57) ABSTRACT

A wireless sonar receiver is provided including a wireless receiver configured to receive sonar data from a wireless sonar transducer configured to receive sonar returns from an underwater environment as first sonar return data, convert the first sonar return data into sonar image data, and transmit the sonar image data wirelessly to the wireless sonar receiver. The wireless sonar receiver also includes a receiver processor and a receiver memory including computer program code configured to, with the receiver processor, cause the wireless sonar receiver to convert the sonar image data to second sonar return data corresponding to the sonar returns received by the wireless sonar transducer. The wireless sonar transducer also includes an output port configured to transmit the second sonar return data to a marine electronic device for processing of the second sonar return data
(Continued)

to generate at least one sonar image for display on a user interface.

20 Claims, 6 Drawing Sheets

(51) Int. Cl.
G01S 15/89 (2006.01)
G01S 15/96 (2006.01)
G01S 7/62 (2006.01)
G01S 15/86 (2020.01)

(56) References Cited

U.S. PATENT DOCUMENTS

| | | | | |
|---|---|---|---|---|
| 3,713,081 | A | * | 1/1973 | Murphree ............... G09B 9/56 367/1 |
| 3,781,775 | A | | 12/1973 | Malloy et al. |
| 3,829,596 | A | * | 8/1974 | Murphree ........... G01S 7/52004 434/6 |
| 3,835,234 | A | * | 9/1974 | Murphree ........... G01S 7/52004 367/131 |
| 3,918,054 | A | * | 11/1975 | Collins .................. G01S 13/28 342/192 |
| 4,179,681 | A | * | 12/1979 | Zehner ................... G01S 15/66 342/181 |
| 4,214,269 | A | * | 7/1980 | Parker .................... G01S 7/298 342/185 |
| 4,216,537 | A | | 8/1980 | Delignieres |
| 4,271,707 | A | * | 6/1981 | Lakin .................. G01N 29/262 73/614 |
| 4,387,365 | A | * | 6/1983 | Berry .................... G01S 7/531 342/185 |
| 4,510,709 | A | | 4/1985 | Melcher |
| 4,597,069 | A | | 6/1986 | Milano et al. |
| 4,644,512 | A | * | 2/1987 | Grilk .................... G01S 7/56 367/108 |
| 4,777,489 | A | * | 10/1988 | Allan .................... G01S 7/064 342/176 |
| 4,879,697 | A | | 11/1989 | Lowrance et al. |
| 4,908,800 | A | * | 3/1990 | DiLemmo ........... G01S 7/52004 367/13 |
| 4,926,399 | A | | 5/1990 | Hickman |
| 4,943,951 | A | | 7/1990 | Leavell et al. |
| 4,986,755 | A | * | 1/1991 | Johnson .................. G09B 9/56 367/1 |
| 5,005,419 | A | * | 4/1991 | O'Donnell ........ G01S 7/52023 600/447 |
| 5,064,376 | A | * | 11/1991 | DeCrescent .......... G09B 9/006 342/169 |
| 5,068,665 | A | * | 11/1991 | Piazza ...................... G01S 7/06 342/177 |
| 5,107,841 | A | * | 4/1992 | Sturgill ............... G01S 15/8979 600/455 |
| 5,122,989 | A | * | 6/1992 | Pirie ....................... G01S 15/74 367/13 |
| 5,142,497 | A | | 8/1992 | Warrow |
| 5,173,947 | A | * | 12/1992 | Chande .................. G06T 19/00 345/422 |
| 5,181,026 | A | * | 1/1993 | Granville ........... G01R 15/183 324/96 |
| 5,184,330 | A | | 2/1993 | Adams et al. |
| 5,200,931 | A | | 4/1993 | Kosalos et al. |
| 5,463,597 | A | | 10/1995 | Harlev |
| 5,483,767 | A | | 1/1996 | Langer |
| 5,493,539 | A | | 2/1996 | Haley et al. |
| 5,537,380 | A | | 7/1996 | Sprankle et al. |
| 5,598,206 | A | | 1/1997 | Bullis |
| 5,808,967 | A | | 9/1998 | Yu et al. |
| 5,838,635 | A | | 11/1998 | Masreliez |
| 5,884,213 | A | | 3/1999 | Carlson |
| 6,222,449 | B1 | * | 4/2001 | Twining ................. A01K 97/00 340/539.11 |
| 6,255,800 | B1 | | 7/2001 | Bork |
| 6,273,771 | B1 | | 8/2001 | Buckley et al. |
| 6,345,179 | B1 | | 2/2002 | Wiegers et al. |
| 6,380,890 | B1 | | 4/2002 | Smith et al. |
| 6,415,209 | B1 | | 7/2002 | Reimer |
| 6,508,192 | B2 | | 1/2003 | Lentine |
| 6,520,105 | B2 | | 2/2003 | Koda et al. |
| 6,581,025 | B2 | | 6/2003 | Lehman |
| 6,667,934 | B1 | | 12/2003 | Healey |
| 6,693,847 | B2 | | 2/2004 | Betts |
| 6,724,688 | B2 | | 4/2004 | Betts et al. |
| 6,735,450 | B1 | | 5/2004 | Remmert |
| 6,771,562 | B2 | | 8/2004 | Betts et al. |
| 6,909,946 | B1 | | 6/2005 | Kabel et al. |
| 7,534,152 | B1 | | 5/2009 | Lloyd et al. |
| 7,538,511 | B2 | | 5/2009 | Samek |
| 8,300,499 | B2 | | 10/2012 | Coleman et al. |
| 8,305,840 | B2 | | 11/2012 | Maguire |
| 8,645,012 | B2 | | 2/2014 | Salmon et al. |
| 8,761,976 | B2 | | 6/2014 | Salmon et al. |
| 8,934,318 | B2 | | 1/2015 | Lebedev et al. |
| 9,132,900 | B2 | | 9/2015 | Salmon et al. |
| 9,360,553 | B2 | | 6/2016 | Lebedev et al. |
| 9,383,444 | B2 | | 7/2016 | Lebedev et al. |
| 9,408,378 | B2 | | 8/2016 | Senanko |
| 9,488,728 | B2 | | 11/2016 | Baumann et al. |
| 9,628,592 | B2 | * | 4/2017 | Wu ...................... H04M 1/0202 |
| 10,284,804 | B2 | * | 5/2019 | Marshall ................. G01S 15/89 |
| 2002/0071345 | A1 | | 6/2002 | Chiang et al. |
| 2003/0078706 | A1 | | 4/2003 | Larsen |
| 2003/0126448 | A1 | * | 7/2003 | Russo ................ G06K 9/00026 713/186 |
| 2003/0236461 | A1 | | 12/2003 | Poland |
| 2004/0179332 | A1 | * | 9/2004 | Smith ...................... A61B 8/00 361/679.41 |
| 2005/0084033 | A1 | * | 4/2005 | Rosen ...................... H04B 1/69 375/295 |
| 2005/0088643 | A1 | | 4/2005 | Anderson |
| 2005/0135192 | A1 | | 6/2005 | Fairbairn |
| 2005/0259515 | A1 | | 11/2005 | Maesawa |
| 2006/0023570 | A1 | | 2/2006 | Betts et al. |
| 2007/0147173 | A1 | * | 6/2007 | Park ....................... G01S 7/521 367/107 |
| 2008/0013404 | A1 | | 1/2008 | Acker et al. |
| 2008/0112265 | A1 | | 5/2008 | Urbano et al. |
| 2009/0037040 | A1 | | 2/2009 | Salmon et al. |
| 2009/0105952 | A1 | | 4/2009 | Grace et al. |
| 2009/0122647 | A1 | | 5/2009 | Betts et al. |
| 2009/0240354 | A1 | | 9/2009 | Davidson |
| 2010/0045448 | A1 | | 2/2010 | Hakinami |
| 2011/0004600 | A1 | | 1/2011 | Walker et al. |
| 2012/0020185 | A1 | | 1/2012 | Welker et al. |
| 2012/0289103 | A1 | | 11/2012 | Hudson et al. |
| 2013/0148471 | A1 | * | 6/2013 | Brown ................ G01S 15/8902 367/88 |
| 2013/0272093 | A1 | * | 10/2013 | Chen ..................... G01S 7/6245 367/88 |
| 2014/0010043 | A1 | * | 1/2014 | Pawlik .................... G01S 15/96 367/7 |
| 2014/0022864 | A1 | | 1/2014 | Lebedev et al. |
| 2014/0057677 | A1 | * | 2/2014 | Liubinas ................. G01S 15/96 455/556.1 |
| 2014/0066125 | A1 | | 3/2014 | Wu |
| 2014/0254324 | A1 | * | 9/2014 | Dubberley ........... G06K 9/4661 367/88 |
| 2014/0269164 | A1 | | 9/2014 | Betts et al. |
| 2014/0336854 | A1 | | 11/2014 | Salmon et al. |
| 2015/0078123 | A1 | | 3/2015 | Batcheller |
| 2015/0078134 | A1 | | 3/2015 | Yu |
| 2015/0100658 | A1 | * | 4/2015 | Lieberman ............ G06F 3/1454 709/208 |
| 2015/0369908 | A1 | | 12/2015 | Zimmerman et al. |
| 2016/0119541 | A1 | * | 4/2016 | Alvarado-Moya ... G06T 3/4038 348/38 |
| 2016/0259053 | A1 | | 9/2016 | Proctor et al. |
| 2016/0341827 | A1 | * | 11/2016 | Horner .................. G01S 7/6245 |
| 2016/0377716 | A1 | * | 12/2016 | Proctor .................... G01S 15/89 367/88 |

(56) References Cited

U.S. PATENT DOCUMENTS

| | | | |
|---|---|---|---|
| 2017/0038460 A1* | 2/2017 | Clark | G01S 15/89 |
| 2017/0082739 A1* | 3/2017 | Horner | G01S 7/521 |
| 2017/0199275 A1* | 7/2017 | Wu | H04M 1/0202 |
| 2017/0213459 A1* | 7/2017 | Ogaz | G01S 5/22 |
| 2018/0228454 A1* | 8/2018 | Butani | A61B 6/4417 |
| 2019/0346567 A1 | 11/2019 | Laster | |

FOREIGN PATENT DOCUMENTS

| | | |
|---|---|---|
| JP | H11023708 A | 1/1999 |
| KR | 100923668 B1 | 10/2009 |
| KR | 100993227 B1 | 11/2010 |
| WO | WO 2001/53148 A1 | 7/2001 |
| WO | WO 2006/017511 A2 | 2/2006 |
| WO | WO 2010/120896 A1 | 10/2010 |
| WO | WO 2011/008430 | 1/2011 |
| WO | WO 2013/108088 A1 | 7/2013 |
| WO | WO 2013/126761 A1 | 8/2013 |
| WO | WO 2014/019019 A1 | 2/2014 |
| WO | WO 2014/144471 A1 | 9/2014 |
| WO | WO 2016/205938 A1 | 12/2016 |

OTHER PUBLICATIONS

International Search Report and Written Opinion of International Application No. PCT/CA2016/050729 dated Aug. 26, 2016.

Global FlyFisher; "Humminbird Smartcast 35" retrieved <http://globalflyfisher.com/humminbird-smartcast-35> Published Mar. 3, 2009.

Lucky; Dot Matrix Wireless Fishfinder FFW718; retrieved from https://www.amazon.co.uk/gp/product/B004HGJJ28/?tag=awp7-21, Feb. 15, 2018. Date Unknown.

Alibaba, Sonar Wireless Fish Finder, Retrieved from <https://www.alibaba.com/showroom/sonar-wireless-fish-finder.html> on Feb. 15, 2018. Date Unknown.

ReelSonar, The iBobber wireless sonar fish finder fishing tool. Retrieve Feb. 16, 2018 from <https://reelsonar.com/>. Date Unknown.

\* cited by examiner

WIRELESS SONAR RECEIVER

CROSS REFERENCE TO RELATED APPLICATION

This application claims priority to Provisional Patent Application No. 62/201,816, entitled "Wireless Sonar Receiver," filed Aug. 6, 2015, which is incorporated by reference herein in its entirety.

FIELD OF THE INVENTION

Embodiments of the present invention relate generally to sonar systems and, more particularly, to a wireless sonar receiver and system utilizing a wireless sonar receiver.

BACKGROUND OF THE INVENTION

Sonar data may be used for a number of different purposes, such as to detect features of and/or objects in an underwater environment. For example, when analyzed, sonar return data may be used to determine depths of a marine environment, detect fish or other waterborne objects, locate wreckage, among other things. Applicant has developed apparatuses, systems, and methods described herein to more easily obtaining such sonar data.

BRIEF SUMMARY OF THE INVENTION

Embodiments of the present invention contemplate utilization of wireless sonar transducers and wireless sonar receivers. Notably, depending on the configuration, the wireless sonar transducers may be capable of gathering sonar return data and also processing the sonar return data to generate sonar image data. The wireless sonar transducers, may be temporarily or permanently mounted to a watercraft or dock, may be castable, or otherwise deployed so as to gather the sonar return data and form the sonar image data. The sonar image data may be wirelessly transmitted by the wireless sonar transducer to a marine electronic device, a portable computing device, such as a tablet computer, mobile phone, smart phone, personal data assistant (PDA), or the like. The marine electronic device may display the sonar image data with little or no further processing.

Some marine electronic devices may be configured to receive via wired or wireless communication the sonar return data and locally generate sonar data images. However, in some cases, these marine electronic devices may not be able to read or manage the sonar image data, thus making them not directly compatible with wireless sonar transducers which transmit the processed sonar image data.

In an example embodiment, a wireless sonar receiver may be provided to receive the sonar image data from the wireless sonar transducer and convert the sonar image data back to sonar return data which may then be processed by the marine electronic device. The conversion of the sonar image data back to sonar return data may result in sonar return data which is the same as the original sonar return data or an approximation which is substantially similar to the original sonar return data.

In some example embodiments, the sonar image data or sonar return data may be digital data, however, the marine electronic device may be configured to receive analog signals. In an example in which the marine electronic device is configured to receive analog sonar return data, the wireless receiver may also include a digital to analog converter configured to convert either the sonar image data or sonar return data to an analog signal. In some example embodiments, the conversion of the sonar image data to sonar return data and the digital to analog conversion may occur simultaneously as a portion of a single conversion process.

The wireless sonar receiver may also include an output port configured to be directly or indirectly coupled to the sonar input port of a marine electronic device. In some embodiments, the output port may be connected to an adapter to connect the wireless sonar receiver to the marine electronic device, such as a universal serial port (USB) to pin connector.

An example embodiment of the present invention includes a wireless sonar receiver including a wireless receiver configured to receive sonar data from a wireless sonar transducer. The wireless sonar transducer is configured to receive sonar returns from an underwater environment as first sonar return data, convert the first sonar return data into sonar image data, and transmit the sonar image data wirelessly to the wireless sonar receiver. The wireless sonar receiver also includes a receiver processor and a receiver memory having computer program code stored thereon. The receiver memory and the computer program code configured to, with the receiver processor, cause the wireless sonar receiver to convert the sonar image data to second sonar return data corresponding to the sonar returns received by the wireless sonar transducer. The wireless sonar receiver also includes an output port configured to transmit the second sonar return data to a marine electronic device. The marine electronic device is configured process the second sonar return data to generate at least one sonar image for display on a user interface.

In an example embodiment, the second sonar return data is substantially similar to the first sonar return data.

In some example embodiments, converting the sonar image data to the second sonar return data comprises converting the sonar image data back into the first sonar return data.

In an example embodiment, the output port is configured to be physically coupled to a marine electronic device adapter. The marine electronic device adapter comprises a first end configured to mate with the output port and a second end configured to mate with an input port on the marine electronic device. In an example embodiment, the second end and the input port comprise pin connectors. In an example embodiment, the first end and the output port comprise universal serial bus (USB) connectors.

In an example embodiment, the wireless sonar receiver also includes a digital to analog converter. The digital to analog converter is configured to receive the sonar image data or the second sonar return data as a digital signal and convert the sonar image data or the second sonar return data to an analog signal.

In an example embodiment, the wireless sonar receiver is configured to be physically coupled to a sonar input port of the marine electronic device.

In an example embodiment, the wireless sonar receiver is configured to be removably coupled to a sonar input port of the marine electronic device.

In an example embodiment, the wireless sonar receiver is configured to receive the sonar image data from the wireless sonar transducer using wireless local area network (WLAN) technology, Wi-Fi technology, Bluetooth technology, cellular technology, or satellite technology.

Example wireless sonar systems, computer program products, and methods of the present invention may also include additional embodiments, such as described above with respect to the example wireless sonar receiver.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

A watercraft configured to traverse a marine environment may use a sonar system disposed on and/or proximate to the watercraft. The watercraft may be a surface watercraft, a submersible watercraft, or any other implementation known to those skilled in the art. The sonar system, in particular, may be used to acquire sonar image data corresponding to an area of water proximate to the watercraft, including areas to the side of, behind, below, and/or to the front of the watercraft. Such sonar image data may be used to identify objects in the area of water.

In one implementation, a sonar system may include one or more sonar transducers, a wireless sonar receiver (e.g., wireless sonar receiver 530 shown in FIG. 5), and a computing device. In such an implementation, the sonar transducers may include one or more wireless sonar transducers (e.g., wireless sonar transducers 550 shown in FIG. 5). The wireless sonar transducers may be in the form of one or more castable transducers, remote mounted transducers, and/or any other implementation of transducers known to those skilled in the art. The one or more wireless sonar transducers may be configured to wirelessly communicate with the wireless sonar receiver, as further described below.

Further, the computing device may be a marine electronic device (e.g., marine electronic device 504 shown in FIG. 5), such as a multi-function display (MFD) device, a fish finder device, a dedicated sonar module, and/or any other implementation known to those skilled in the art. In other implementations, the sonar system may include a plurality of marine electronic devices. Some marine electronic devices may lack the ability and/or the components to wirelessly communicate with the wireless transducers. As such, those computing devices may be coupled with the wireless sonar receiver, as further described below, to allow for communication with the one or more wireless transducers.

Figure 1:
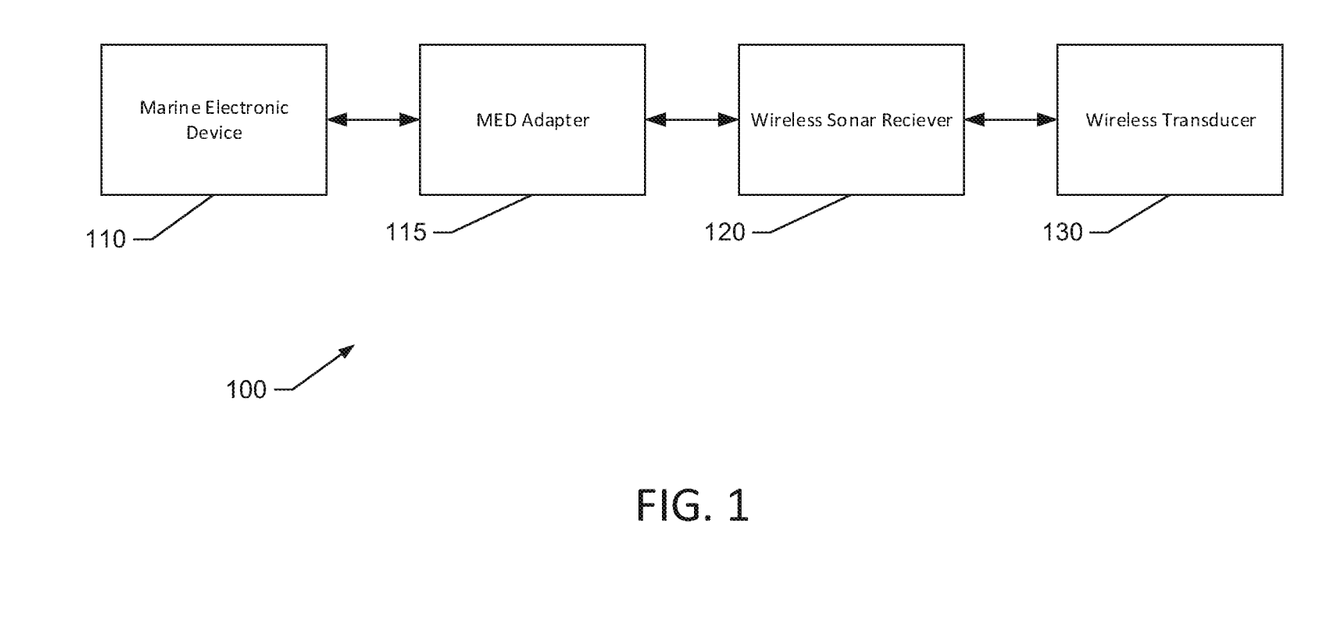
FIG. 1 illustrates a block diagram of a sonar system, in accordance with some embodiments discussed herein.

FIG. 1 illustrates a block diagram of a sonar system 100 having a marine electronic device 110, a marine electronic device (MED) adapter 115, a wireless sonar receiver 120, and a wireless sonar transducer 130 in accordance with implementations of various techniques described herein.

The wireless sonar transducer 130 may be configured to transmit one or more sonar pulses or beams into an underwater environment. The wireless sonar transducer may receive sonar return data from the underwater environment indicative of fish, objects, bottom depth or contours, or the like. In some embodiments the wireless sonar transducer may include processing circuitry, such as memory 562 and processor 560 discussed below in referenced to FIG. 5. The processing circuitry may be configured to convert the sonar return data received from the underwater environment to sonar image data for display on a user interface, such as a user interface of a marine electronic device 110, a portable computing device, such as a tablet computer, laptop computer, smart phone, or the like.

The wireless transmission of the sonar image data from the wireless sonar transducer 130 to the marine electronic device 110, via the wireless sonar receiver 120, may be via any wireless communication system. Some example wireless communications systems, which the sonar system 100 may utilize, may include wireless local area network (WLAN) technology, Wi-Fi technology, Bluetooth technology, cellular technology, satellite technology, or the like.

In some example embodiments, the marine electronic device 110 may be configured to receive sonar return data and locally generate sonar image data for display. In an instance in which the marine electronic device is configured to receive sonar return data, the wireless sonar receiver 120 may be configured convert the sonar image data received from the wireless sonar transducer 130 to another format that can be read or processed by the marine electronic device 110. For example the wireless sonar receiver 120 may include processing circuitry, such as receiver processor 532 and receiver memory 534 discussed below in reference to FIG. 5. The wireless sonar receiver processing circuitry may be configured to receive the sonar image data from the wireless sonar transducer 130 and back convert the sonar image data to sonar return data for processing by the marine electronic device 110.

The wireless sonar receiver 120 may reverse the processing of the sonar return data to the sonar image data to generate a second sonar return data based on the sonar image data. The second sonar return data may be an approximation of the sonar return data used to generate the sonar image data. In some example embodiments, the second sonar return data may be identical or substantially similar to the sonar return data. The wireless sonar receiver 120 may transmit the second sonar return data to the marine electronic device 110 for processing to generate at least one sonar image for displaying on the user interface.

In some example embodiments, the marine electronic device 110 may be configured to receive analog sonar return data. The wireless sonar receiver 120 may include a digital to analog converter, as shown below in FIG. 5. The digital to analog converter may be configured to convert the sonar image data and/or the second sonar return data from a digital to an analog signal for processing by the marine electronic device 110. In some example embodiments, the sonar image data may be converted to the second sonar return data in the same process as the digital to analog conversion, such that a digital sonar image data is converted to analog second sonar return data.

In some example embodiments, the wireless sonar receiver 120 may include an output port configured to transmit the second sonar return data to the marine electronic device 110. The sonar input port of the marine electronic device 110 may be configured, designed, and/or shaped to connect to wired transducers. Accordingly, in such implementations, the wireless sonar receiver 120 may be configured, designed, and/or shaped to physically couple to such a sonar input port (e.g. a communication port, a data port, and/or the like) of the marine electronic device 110. In such an implementation, the wireless sonar receiver 120 may be a dongle or a similar piece of hardware that is configured to couple to the sonar input port of the marine electronic device 110. For example, the wireless sonar receiver 120 may be similar in size and/or shape to a universal serial bus (USB) flash drive device. In such implementations, the wireless sonar receiver 120 may be removably coupled to the marine electronic device 110 in that the wireless sonar receiver may be inserted into or pulled out of the sonar input port of the marine electronic device 110. In some example embodiments, the marine electronic device 110 may supply power to the wireless sonar receiver 120 via the sonar input port.

In some instances the output port may not be directly compatible with a sonar input port of the marine electronic device 110, for example the output port may be a serial port, universal serial bus (USB) connector, micro USB connector, a pin connector, or the like. The sonar input port of the marine electronic device 110 may include a serial port, pin connector, or the like which is not compatible for mating with the output port. The MED adapter 115 may be provided to electrically connect the wireless sonar receiver 120 to the marine electronic device 110. In one example embodiment, the wireless sonar receiver 130 may include a female USB connector for the output port and the MED adapter 115 may include a male USB connector at a first end. The marine electronic device 110 may include a pin connector for the sonar input port and the MED adapter 115 may include a complementary pin connector at a second end.

Once the wireless sonar receiver 120 is physically coupled to the sonar input port of the marine electronic device 110, the wireless sonar receiver 120 may be able to directly transfer data to and from the marine electronic device 110. In particular, once coupled, the wireless sonar receiver 120 may transfer the second sonar return data to the marine electronic device. The marine electronic device 110 may then process the second sonar returns to generate the sonar image data to be displayed on a user interface, as discussed above. In an example embodiment, the marine electronic device 110 may also be configured to transmit data to the wireless sonar receiver 120 or wireless sonar transducer 130 via the sonar input port.

Figure 2:
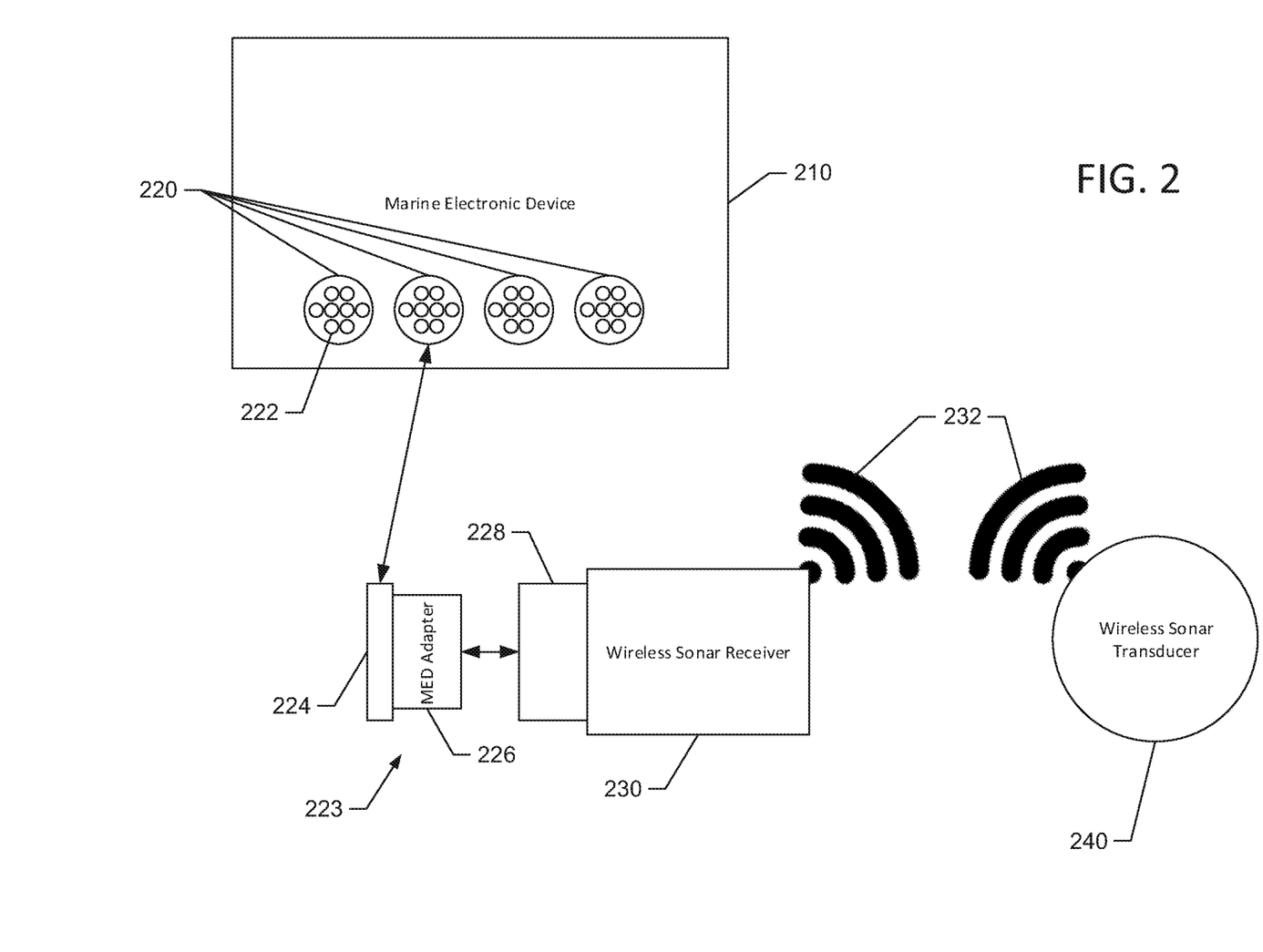
FIG. 2 illustrates an example wireless sonar system, in accordance with some embodiments discussed herein.

FIG. 2 illustrates a marine electronic device 210 configured to couple to a wireless sonar receiver 230 in accordance with implementations of various techniques described herein. As shown, sonar input ports 220 on a back panel of the marine electronic device 210 may be configured to physically couple to the wireless sonar receiver 230. In addition, the wireless sonar receiver 230 is configured to wirelessly communicate with the wireless sonar transducer 240. In some example embodiments, the wireless sonar receiver 230 may be removably coupled to the sonar input ports 220 via an MED adapter 223, as discussed above in reference to FIG. 1.

In operation, the wireless transducer 240 may wirelessly transmit sonar image data to the wireless sonar receiver 230, based on sonar return data received from the underwater environment, via wireless communication 232. If coupled to the sonar input port 220, the wireless sonar receiver 230 may then generate second sonar data based on the sonar image data, which corresponds the sonar returns received by the wireless sonar transducer 240. The wireless sonar receiver 230 may transfer the second sonar return data to the marine electronic device 210 for processing and/or display. In a further implementation, the marine electronic device 210 may also transmit data to the wireless sonar receiver 230, which in turn transmits data to the wireless transducer 240. The wireless sonar receiver 230 may be used to provide wireless communication with the marine electronic device 210. In particular, the wireless sonar receiver 230 may provide such capability to those marine electronic devices that may be older and/or constructed without a capability for wireless communication.

As discussed above, the wireless communication 232 may include wireless local area network (WLAN) technology, Wi-Fi technology, Bluetooth technology, cellular technology, satellite technology, or any other wireless communication implementation known to those skilled in the art. The wireless sonar receiver 230 may also include a transmitting element to transmit wireless data to the wireless transducer. For example, the transmitting element may be the same transceiver used for receiving wireless data from the wireless sonar transducer 240.

In the depicted example, the wireless sonar receiver 230 is coupled to the marine electronic device via the MED adapter 223. The sonar input ports 220 of the marine electronic device 210 are pin connectors including a plurality of pins 222. The output port 228 of the wireless sonar receiver 230 may include a female USB connector. The MED adapter 223 may have a first end 224 configured to electrically connect to one of the sonar input ports 220. The first end 224 may include a complementary pin connector to the sonar input port 220. The MED adapter may also include a second end 226 configured to be electrically connected to the output port 228. The second end 226 may include a male USB connector complementary to the female USB connector of the output port 228.

As discussed above, the wireless sonar transducer 240 may be configured to generate sonar image data. In one implementation, the wireless sonar transducer 240 may receive one or more transmit signals from the marine electronic device 210 (via the wireless sonar receiver 230), and, in response, produce the one or more sonar output signals, e.g. sonar beams or pulses. The wireless sonar transducer 240 may emit sonar output signals into an area of water, such as proximate to the watercraft. Based on the wireless sonar transducer 240 position with respect to the watercraft and/or the arrangement of the wireless sonar transducer 240, the sonar output signals may be emitted from various directions relative to the watercraft, such as in front of the watercraft. Properties of the sonar output signals generated by the wireless transducer may be determined by an area and shape of the wireless sonar transducer 240, the sound wave frequency of the wireless sonar transducer 240, the sound velocity of the propagation medium (e.g. a body of water), or the like.

Reflected sonar output signals may be received by the wireless sonar transducer 240 in the form of one or more sonar return signals, e.g. sonar return data. Sonar return data may represent one or more sonar returns that have reflected from a surface of an object in the area of water. In one implementation, an object may be a point on an underwater floor, a portion of a fish, a piece of debris, and/or any other waterborne object known to those skilled in the art. In turn, the wireless sonar transducer 240 may convert the sonar return data into sonar image data to be sent to the marine electronic device 210 for processing using the wireless sonar receiver 230, as described above. The sonar image data may be in form of analog or digital signals that are representative of the sonar return data and configured to be displayed on a user interface.

In an example embodiment, the wireless sonar transducer 240 may be a piezoelectric transducer or capacitive transducer. In particular, the wireless sonar transducer 240 may use piezoelectric crystals configured as transceivers that can transmit the sonar output signals and detect the sonar return signals. In one such implementation, the piezoelectric crystals may include a property of changing size when a voltage is applied, where applying an alternating current (AC) across the piezoelectric crystals causes oscillations at high frequencies, thereby generating high frequency sound waves.

The wireless sonar transducer 240 may be positioned at one or more locations in a marine environment. In some embodiments, the wireless sonar transducer 240 may be positioned in a location/position that is on and/or proximate to the watercraft in any configuration known to those skilled in the art. In one implementation, the wireless sonar transducer 240 may be in one or more housings that are flexibly mounted to a hull of the watercraft. In a further implementation, the wireless sonar transducer 240 may be mounted to the hull of the watercraft, such that the wireless sonar transducer 240 is submerged in the water proximate to the watercraft, as discussed below in reference to FIG. 3. Additionally or alternatively, the wireless sonar transducer may be configured as a castable transducer, as discussed below in reference to FIG. 4. Though the above examples described that the wireless sonar transducer is proximate to a watercraft, in some embodiments, the wireless sonar transducer need not be proximate to a watercraft.

Figure 3:
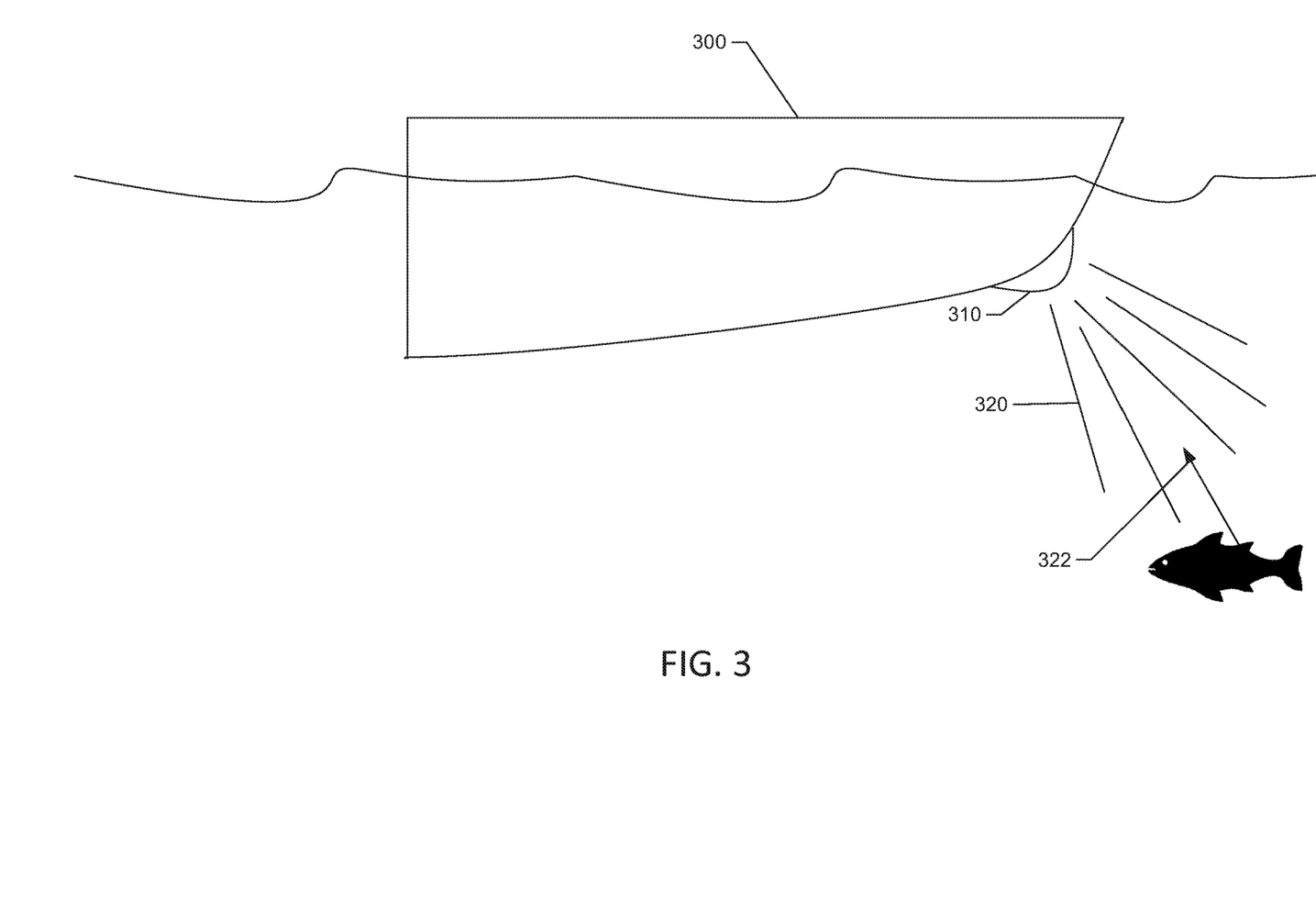
FIG. 3 illustrates a watercraft having a wireless transducer disposed thereon, in accordance with some embodiments discussed herein.

FIG. 3 depicts a watercraft 300 having a wireless transducer 310 disposed thereon in accordance with implementations of various techniques described herein. In particular, the wireless transducer 310 may be coupled to a hull of the watercraft 300, such that the wireless sonar transducer 310 may be configured to downwardly emit one or more sonar output signals 320, e.g. beams or pulses, in an area of water in front or beneath the watercraft 300. The wireless sonar transducer may be permanently mounted, such as by screws, rivets or the like, or may be temporarily mounted, such as by adhesive tape, clips, or the like to the watercraft 300. Additionally or alternatively, the wireless sonar transducer 310 may be mounted to or hung over the side of the watercraft 300.

In an example embodiment, the wireless sonar transducer 310 may be positioned to acquire sonar return data associated with a sonar return 322 in the direction of travel of the watercraft 300 and or the area beneath the watercraft 300. As discussed above, the sonar return data may be processed by the wireless sonar transducer 310 to generate sonar image data and then sent to a wireless sonar receiver to be converted back to sonar return data for processing by a marine electronic device.

Figure 4:
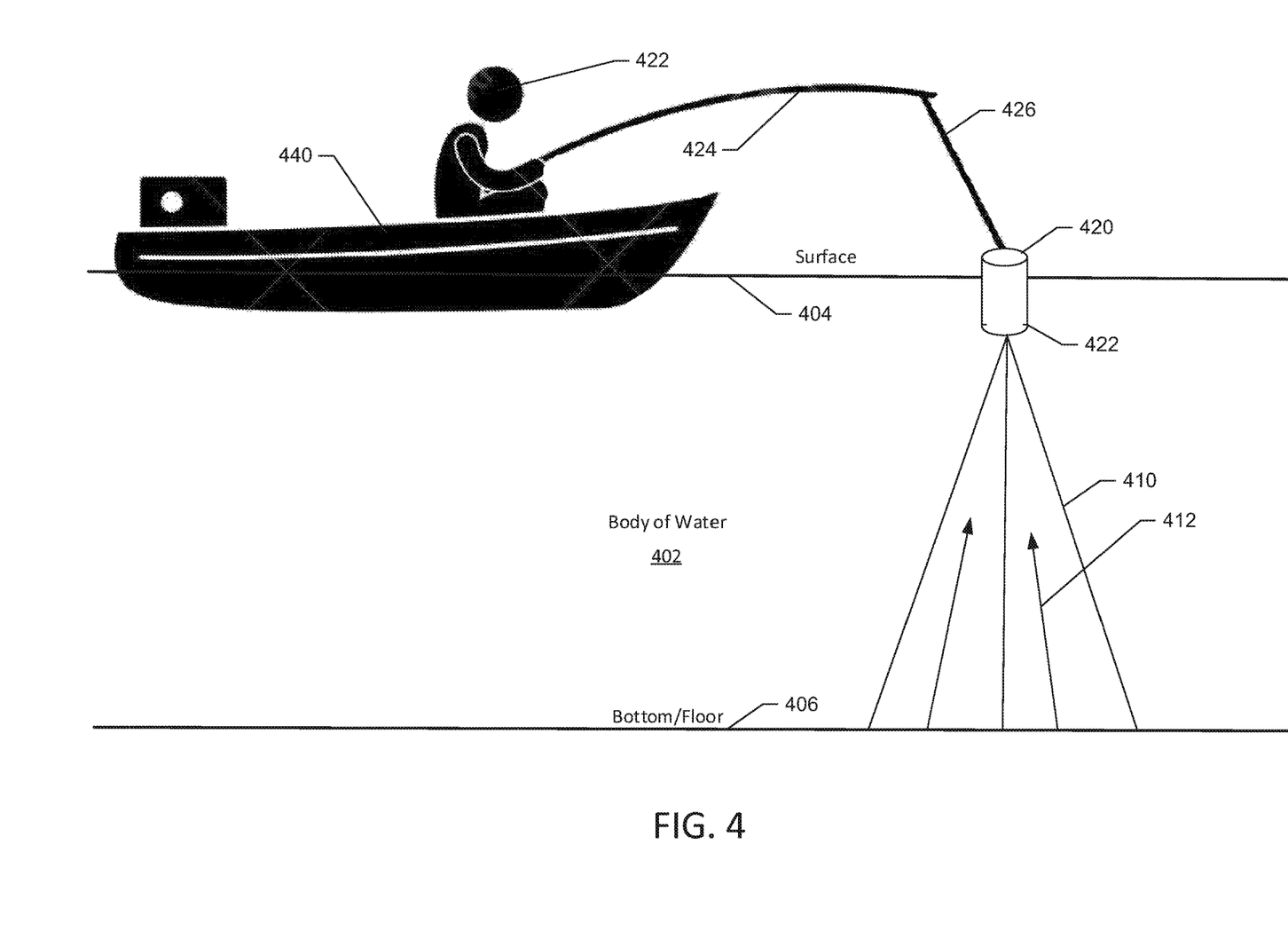
FIG. 4 illustrates an example castable transducer disposed proximate to a watercraft, in accordance with some embodiments discussed herein.

FIG. 4 illustrates an example embodiment in which the wireless sonar transducer is a castable transducer 420. The castable transducer 420 may be incorporated inside of or attached to a castable device. For instance, as a castable device, the castable transducer 420 may be coupled to a casting device, such as a rod 424 (e.g. a fishing rod or pole), via a line 426 (e.g. a fishing line). The rod 424 may be configured for casting the castable transducer 420 by the user 422. As shown in FIG. 4, the user 422 may cast the castable transducer 420 into the body of water 402, while the user 422 (e.g. boat pilot, fisherman, or the like) is positioned within a watercraft 440, such as a boat, that is positioned in a body of water 402.

The castable transducer 420 may be part of a device that is configured to at least partially float on a surface 404 of the body of water 402, or as part of a device that is configured to at least partially submerge below the surface 404 of the body of water 402. The sonar returns 412 captured by the castable transducer 420 may be used for imaging underwater environmental features in the body of water 402, including mapping an underwater environment below the surface 404 of the body of water 402 and/or between the surface 404 of the body of water 402 and a bottom or floor 406 of the body of water 402.

The castable transducer 420 may be disposed proximate to a watercraft 440, such as by casting a pole or fishing rod 424. The castable transducer 420 may emit a sonar beam 410 or pulse. In some example embodiments, the castable transducer 420 may have one or more sensors 422, such as electrode terminals, configured to detect submersion of at least a portion of the castable transducer 420 and activate the castable transducer 420 when deployed in water (e.g. the body of water 402). In the depicted example, the one or more sensors 422 may be configured for automatically sensing deployment of the transducer 420 in water, which may occur after casting the transducer 420 in the body of water 402 by a user 422.

In an example embodiment, the castable transducer 420 may be positioned to acquire sonar return data associated with a sonar return 412 in an area proximate to the watercraft 400. As discussed above, the sonar return data may be processed by the wireless sonar transducer into sonar image data and then sent to a wireless sonar receiver to be converted back to sonar return data for processing by a marine electronic device. Additionally or alternatively the castable transducer 420 may receive command signals from a portable computing device and/or a marine electronic device to cause the castable transducer 420 to commence and/or terminate gathering or recording sonar returns 412.

In an example embodiment, the one or more sensors 422 (e.g. water sensor) may be configured for automatically sensing removal of the castable transducer 420 from the body of water 402, which may occur after reeling in the transducer 420 out of the body of water 402 by the user 422. For instance, the castable transducer 420 may be coupled to the rod 424 and be reeled out of the body of water 402 by the user 422 via the line 426. The rod 424 may be configured as a user-actuable rod that is configured for reeling the castable transducer 420 by the user 422. As such, the user 422 may reel the castable transducer 420 out of the body of water 402, while the user 422 is positioned within the watercraft 440.

EXAMPLE SYSTEM ARCHITECTURE

Figure 5:
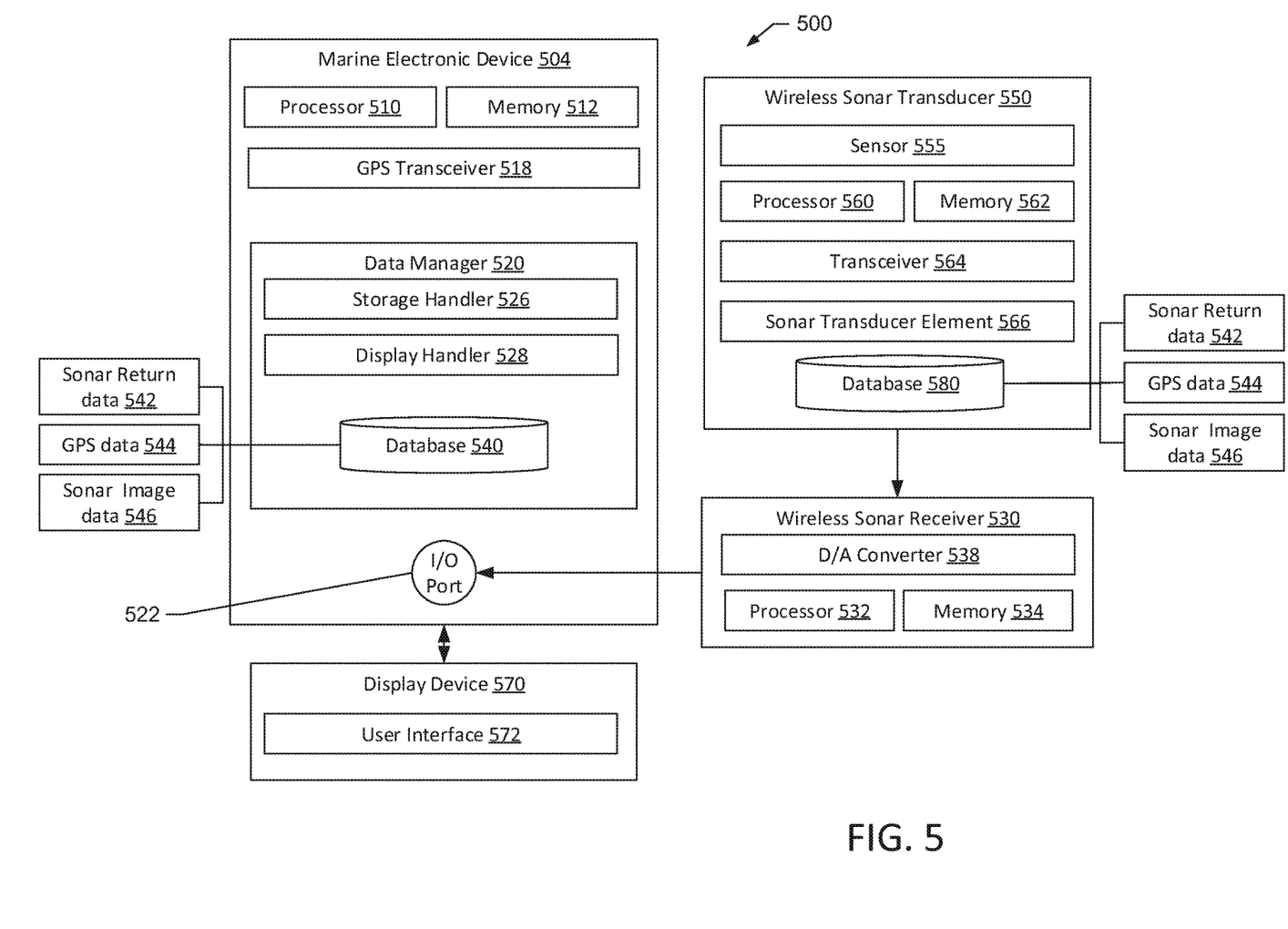
FIG. 5 illustrates an example sonar system including a wireless sonar receiver, in accordance with some embodiments discussed herein.

FIG. 5 illustrates an example wireless sonar system 500 including a wireless sonar receiver in accordance with an example embodiment. The sonar system may include a marine electronic device 504, a wireless sonar transducer 550, and a wireless receiver 530. The marine electronic device 504 may include a multi-function display (MFD) device, a fish finder device, a dedicated sonar module, and/or any other implementation known to those skilled in the art. The marine electronic device 504 may be configured to process and/or display various types of data, including marine electronics data. Marine electronics data may include chart data, sonar data (e.g. sonar return data and/or sonar image data), structure data, radar data, navigation data, position data, heading data, automatic identification system (AIS) data, Doppler data, speed data, course data, or any other type known to those skilled in the art.

The marine electronic device 504 may be coupled to the wireless sonar receiver, such that the marine electronic device 504 can process the sonar return data received from a wireless transducer 550 via the wireless sonar receiver 530. In one implementation, and as known to those skilled in the art, the marine electronic device 504 may perform such processing to determine locations of one or more objects with respect to a watercraft and/or transducer within the marine environment. In a further implementation, the marine electronic device 504 may perform such processing using one or more sonar processors.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronic devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g. by hardwired links, wireless links, or combinations thereof. In a distributed computing environment, program modules may be located in both local and remote computer storage media including memory storage devices.

Sonar systems may include the use of such computing systems, including the one or more computing devices. Returning to FIG. 5, the marine electronic device 504 may include one or more computing systems to collect various types of data and/or information related to imaging subsurface environmental features in a body of water, such as sonar return data. Imaging subsurface environmental features in a body of water may include mapping an underwater environment below a surface of the body of water between the surface of the body of water and the bottom or floor of the body of water. The marine electronic device 504 may be an MFD device, an example of which is described below with respect to FIG. 6, which may be used to record, store, display, receive, and transmit marine electronics data, including sonar image data and/or sonar return data.

In an example embodiment, the marine electronic device 504 may include standard elements and/or components, including at least one processor 510, memory 512 (e.g. non-transitory computer-readable storage medium), at least one database 540, power, peripherals, and various other computing elements and/or components that may not be specifically shown in FIG. 5. Further, the sonar system 500 may be associated with a display device 570 (e.g. a monitor or other display) that may be used to provide a user interface (UI) 572, including a graphical user interface (GUI). In FIG. 5, the display device 570 is shown as a separate component; however, the display device 570 may be incorporated as part of the marine electronic device 504. The UI 572 may be used to receive one or more preferences from a user of the display device 570 for managing or utilizing the sonar system 500, including interfacing with the wireless transducer 550. Further, the user may set up desired behavior of the marine electronic device 504 and/or wireless transducer 550 via user-selected preferences using the UI 572 associated with the display device 570. For example, the marine electronic device 504 may be configured to transmit one or more transmit signals to the wireless transducer 550, such that, in response, the wireless transducer 550 produces one or more sonar output signals, e.g. beams or pulses. Additionally, the processor 510 of the marine electronic device 504 may be used for marine based applications, which may include various capabilities for controlling operation of a watercraft (e.g. a boat).

The marine electronic device 504 may be configured to interface and communicate with the wireless transducer 550. A wireless sonar receiver 530 may be coupled, directly or via an adapter, to an input/output port 522, e.g. a sonar input port of the marine electronic device 504, where the wireless sonar receiver 530 may be configured to communicate with corresponding transceiver 564 of the wireless sonar transducer 550. Using the wireless sonar receiver 530 and the wireless sonar transceiver 550, various types of data including sonar return data 542 and or sonar image data 546 may be communicated, transmitted, and/or relayed between the marine electronic device 504 and transceiver 564 of the wireless sonar transducer 550.

In some example embodiments, the wireless sonar transducer 550 may include at least one processor 560, memory 562 (e.g. non-transitory computer-readable storage medium), at least one database 580, power, peripherals, and various other computing elements and/or components that may not be specifically shown. The wireless sonar transducer 550 may include instructions recorded on a non-transitory computer-readable medium (e.g. the memory 562) and executable by the at least one processor 560. The wireless sonar transducer 550 may be configured to interface and communicate with the marine electronic device 504. The wireless sonar transducer 550 may include the transceiver 564 configured to communicate with the wireless sonar receiver 530 coupled to the marine electronic device 504. The wireless sonar transceiver 550 may generate sonar image data 546 based on the sonar return signals, e.g. sonar return data 542, received by one or more sonar transducer element 566 of the wireless transducer 550. Using the wireless sonar receiver 530 and the transceiver 564, various types of data including sonar image data may be communicated, transmitted, and/or relayed between the wireless sonar transducer 550 and the marine electronic device 504. In one implementation, the marine electronic device 504 may interface and communicate with the wireless sonar transducer 550 via wired and/or wireless connections known to those skilled in the art.

Further, the database 580 may be configured to store and/or record the sonar return data 542 generated by the transducer elements 566 of the wireless transducer 550. The database 540 may be further configured to the store sonar image data 546 associated with the sonar return data 542.

The wireless sonar transducer 550 may be configured to include the transceiver 564. The wireless sonar transducer 550 may be configured to interface and communicate with the marine electronic device 504 via the transceiver 564, such as an RF transceiver, which may be configured to wirelessly communicate with the corresponding wireless sonar receiver 530 coupled to the marine electronic device 504 via a wireless communication channel. The transceiver 564 may transmit various types of data including sonar image data 546 to the wireless sonar receiver 530.

The wireless sonar receiver 530 may include at least one processor 532, memory 534 (e.g. non-transitory computer-readable storage medium), and various other computing elements and/or components that may not be specifically shown. The wireless sonar receiver 530 may include instructions recorded on a non-transitory computer-readable medium (e.g. the memory 534) and executable by the at least one processor 532. The wireless sonar receiver 530 may be configured to convert the sonar image data received from the wireless sonar transducer 550 into second sonar return data corresponding to the sonar return data received by the wireless sonar transducer 550. The wireless sonar transducer 530 may be further configured to interface and communicate with the marine electronic device 504 to transmit the second sonar return data to the marine electronic device 504.

In some example embodiments the wireless sonar receiver 530 also includes a digital to analog converter 538. The digital to analog converter 538 may convert analog signals received from the marine electronic device 504 to digital signals for processing by the wireless sonar transducer 550. Similarly, the digital to analog converter may be configured to convert digital signals from the wireless sonar transducer 550 to analog signals for processing by the marine electronic device 504. In one example embodiment, the digital to analog converter 538 may be configured to convert digital sonar image data 546 or digital second sonar return data to analog signals. In some example embodiments, the digital to analog conversion of the sonar image data 546 or sonar return data may be performed in conjunction with the conversion of the sonar image data 546 to sonar return data 52, e.g. second sonar return data.

In some examples, the marine electronic device 504 may be configured to receive and recognize sonar return data 542 communicated, transmitted, and/or relayed from the wireless transducer 550, and after processing the sonar return data scroll and/or display the sonar image data to a user via the display device 570. The marine electronic device 504 may further begin to display the sonar image data according to the behavior setup by the user via the user-selected preferences inputted by the user via the UI 572. Further, the database 540 may be configured to store and/or record the sonar return data 542 associated with the wireless transducer 550. The database 540 may be configured to store and/or record sonar image data 546 associated with the sonar return data 542.

In another implementation, the computing device 504 may automatically upload the sonar image data 546 and/or sonar return data 542 to a remote server or database via a wired or wireless network.

For instance, the marine electronic device 504 may be configured to interface and communicate with a network server (e.g. a cloud server) via a network (e.g. a cloud based network). The marine electronic device 504 may include a network interface, such as a wired or wireless device configured to interface and communicate with various types of network communication protocols (e.g. Ethernet, Bluetooth, Wi-Fi, LAN, WLAN, cellular, and/or the like). The marine electronic device 504 may be configured to interface and communicate with one or more network servers over a network via one or more of the various types of network communication protocols. Using the network interface, various types of data including the sonar return data 542 and/or sonar image data 546 may be communicated, transmitted, and/or relayed between the marine electronic device 504 and the network server(s). As such, the marine electronic device 504 may be configured to automatically record the sonar return data 542 and/or the sonar image data 546 in memory (e.g. database 540), display the sonar image data 546 to a user via the display device 570, and/or upload the sonar return data 542 and/or sonar image data 546 to at least one database server via network, such as a wired or wireless network. The database server may be configured to store and/or record the sonar return data 542 and/or sonar image data 546 associated with the transducer 550

The marine electronic device 504 may include a GPS transceiver 518, such as a radio frequency (RF) transceiver configured to receive GPS related data and/or information 544 from a global positioning satellite system, relay antenna, and/or the like. The GPS data 544 may include geo-coordinate, geo-spatial, and/or geographical positioning related data generated and/or received by the GPS transceiver 518. The GPS data 544 may be associated with tracking geospatial coordinates of the marine electronic device 504 and/or the wireless sonar transducer 550. The GPS data 544 may be communicated, transmitted, and/or relayed between the marine electronic device 504 and a network database server. The database 540 may be configured to store and/or record the GPS data 544 in association with the sonar return data 542 and/or sonar image data 546, which may be associated with the wireless transducer 550.

In one implementation, the marine electronic device 504 may include computer-executable instructions related to a data manager or module 520 configured to cause the at least one processor 510 to manage the sonar return data 542 and/or sonar image data 546. In some examples, the data manager 520 may be configured to manage geographical positioning related data (i.e., GPS data 544) received and/or generated by the GPS transceiver 518. The geographical positioning related data may be associated with tracking geospatial coordinates. As described, the computer-executable instructions may be stored and/or recorded on a non-transitory computer-readable storage medium (e.g. memory 512).

The data manager 520 may include computer-executable instructions related to a storage handler or software module 526 configured to automatically record the sonar return data 542 and/or sonar image data 546 in memory (e.g. memory 512 and/or database 540) upon receiving the sonar data 542 from the wireless sonar receiver 514. In some examples, recording the sonar return data 542 and/or sonar image data 546 associated with the wireless sonar transducer 550 may include logging the sonar return data 542 and/or sonar image data 546 associated with the transducer 550 and the geographical coordinate data (i.e., GPS data 544) generated by a GPS transceiver 518 associated with the transducer 550. In some examples, the storage handler 526 may be configured to automatically upload the sonar return data 542, sonar image data 546, and/or the GPS data 544 to at least one database via a network, such as, e.g. a remote server database (e.g. a cloud based server) via a communication network (e.g. a cloud based network), including a wireless communication network.

The data manager 520 may include computer-executable instructions related to a display handler or software module 528 configured to display images associated with the sonar image data 546, e.g. to a user via the display device 570. The display handler 528 may be configured to generate the sonar image data 546 associated with the sonar data 542 and further display images generated from the sonar image data 546 to a user via a display, such as the display device 570. The display handler 528 may be configured to display images associated with a map to the user based on the sonar image data 546 and the geographical coordinate data (i.e., GPS data 544).

Figure 6:
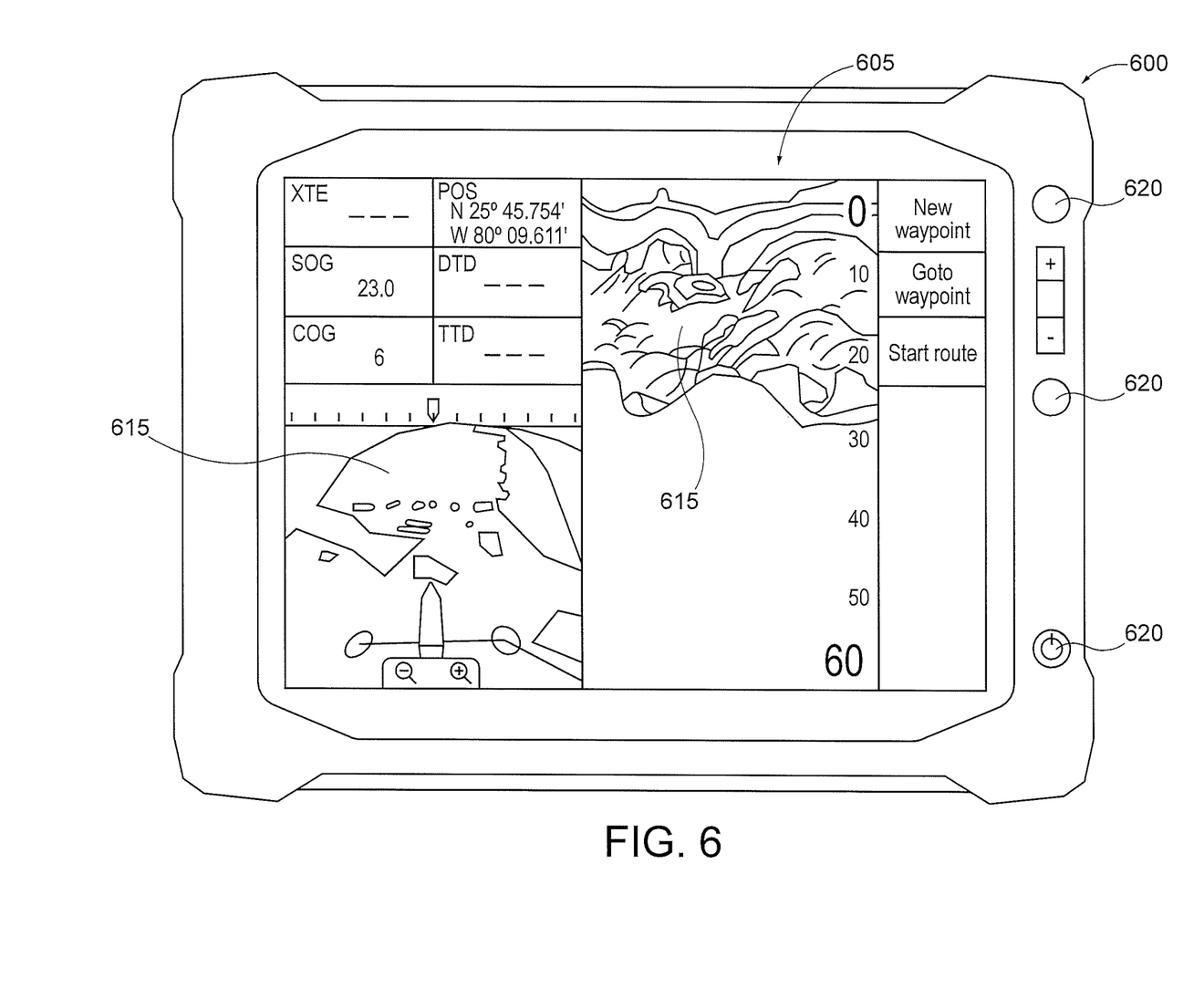
FIG. 6 illustrates an example marine electronic device, in accordance with some embodiments discussed herein.

FIG. 6 illustrates an example schematic of a marine electronic device 600 in accordance with implementations of various techniques described herein. The marine electronic device 600 may be in the form of a multi-function display (MFD) device.

The marine electronic device 600 includes a screen 605. In certain implementations, the screen 605 may be sensitive to touching by a finger. In other implementations, the screen 605 may be sensitive to the body heat from the finger, a stylus, or responsive to a mouse. The marine electronic device 600 may be attached to a National Marine Electronics Association (NMEA) bus or network. The marine electronic device 600 may send or receive data to or from another device attached to the NMEA 2000 bus. For example, the marine electronic device 600 may transmits commands and receive data from a motor or a sensor using an NMEA 2000 bus. In one implementation, the marine electronic device 600 may be capable of steering a watercraft and controlling the speed of the watercraft, i.e., autopilot. For example, one or more waypoints may be input to the marine electronic device 600, and the marine electronic device 600 may steer a watercraft to the one or more waypoints. The marine electronic device 600 may transmit or receive NMEA 2000 compliant messages, messages in a proprietary format that do not interfere with NMEA 2000 compliant messages or devices, or messages in any other format. The device 600 may display marine electronic data 615. The marine electronic data types 615 may include chart data, radar data, sonar image data, sonar return data, steering data, dashboard data, navigation data, fishing data, engine data, and the like. The marine electronic device 600 may also include a plurality of buttons 620, which may be either physical buttons or virtual buttons, or a combination thereof. The marine electronic device 600 may receive input through a screen 605 sensitive to touch or buttons 620.

As mentioned above, a marine computing system may be used to record and process sonar image data or sonar return data. In one implementation, the marine computing system may take the form of a marine electronic device 600. The marine electronic device 600 may be operational with numerous general purpose or special purpose computing system environments or configurations.

The marine electronic device 600 may include any type of electrical and/or electronics device capable of processing data and information via a computing system. In one implementation, the marine electronic device 600 may be a marine instrument, such that the marine electronic device 600 may use the computing system to display and/or process the one or more types of marine electronics data.

The computing system may include a central processing unit (CPU), a system memory, a graphics processing unit (GPU), and a system bus that couples various system components including the system memory to the CPU. In various examples, the computing system may include one or more CPUs. The CPU may include a microprocessor, a microcontroller, a processor, a programmable integrated circuit, or a combination thereof. The CPU can comprise an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for display on the screen 605. In certain implementations, the screen 605 may be sensitive to touching by a finger. In other implementations, the screen 605 may be sensitive to the body heat from the finger, a stylus, or responsive to a mouse.

The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For example, such computer-readable media may include computer storage media and communication media. Computer storage media may include volatile and nonvolatile, and removable and nonremovable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs.

In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi technology, cellular technology, Bluetooth technology, satellite technology, or any other implementation known to those skilled in the art. The network interface may also utilize remote access technologies (e.g. Remote Access Service (RAS), Virtual Private Networking (VPN), Secure Socket Layer (SSL), Layer 2 Tunneling (L2T), or any other suitable protocol). In some examples, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for example, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the watercraft on which the marine electronic device 600 is disposed. The GPS receiver system may then transmit the position data to the marine electronic device 600. In other examples, any positioning system known to those skilled in the art may be used to determine and/or provide the position data for the marine electronic device 600.

The marine electronics system may include one or more components disposed at various locations on the watercraft. Such components may include one or more data modules, sensors, instrumentation, and/or any other devices known to those skilled in the art that may transmit various types of data to the marine electronic device 600 for processing and/or display. The various types of data transmitted to the marine electronic device 600 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type known to those skilled in the art.

In one implementation, the marine electronics system may include a radar sensor for recording the radar data and/or the Doppler data, a compass heading sensor for recording the heading data, and a position sensor for recording the position data. In a further implementation, the marine electronics system may include a sonar transducer for recording the sonar return data and/or the sonar image data, an AIS transponder for recording the AIS data, a paddlewheel sensor for recording the speed data, and/or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contem- That which is claimed:

1. A wireless sonar receiver comprising:
a wireless receiver configured to receive first sonar image data from a wireless sonar transducer, wherein the wireless sonar transducer is configured to receive sonar returns from an underwater environment as first sonar return data, convert the first sonar return data into the first sonar image data, and transmit the first sonar image data wirelessly to the wireless sonar receiver;
a receiver processor;
a receiver memory having computer program code stored thereon, the receiver memory and the computer program code configured to, with the receiver processor, cause the wireless sonar receiver to:
convert the first sonar image data to second sonar return data, wherein the second sonar return data corresponds to the sonar returns received by the wireless sonar transducer; and
an output port configured to transmit the second sonar return data to a marine electronic device, wherein the marine electronic device is configured to process the second sonar return data to generate second sonar image data and at least one sonar image from the second sonar image data for display on a user interface.

2. The wireless sonar receiver of claim 1, wherein the second sonar return data is substantially similar to the first sonar return data.

3. The wireless sonar receiver of claim 1, wherein converting the first sonar image data to the second sonar return data comprises converting the first sonar image data back into the first sonar return data.

4. The wireless sonar receiver of claim 1, wherein the output port is configured to be physically coupled to a marine electronic device adapter, wherein the marine electronic device adapter comprises a first end configured to mate with the output port and a second end configured to mate with an input port on the marine electronic device.

5. The wireless sonar receiver of claim 4, wherein the second end and the input port comprise pin connectors.

6. The wireless sonar receiver of claim 4, wherein the first end and the output port comprise universal serial bus (USB) connectors.

7. The wireless sonar receiver of claim 1 further comprising:
a digital to analog converter, wherein the digital to analog converter is configured to receive the first sonar image data or the second sonar return data as a digital signal and convert the first sonar image data or the second sonar return data to an analog signal.

8. The wireless sonar receiver of claim 1, wherein the wireless sonar receiver is configured to be physically coupled to a sonar input port of the marine electronic device.

9. The wireless sonar receiver of claim 1, wherein the wireless sonar receiver is configured to be removably coupled to a sonar input port of the marine electronic device.

10. The wireless sonar receiver of claim 1, wherein the wireless sonar receiver is configured to receive the first sonar image data from the wireless sonar transducer using wireless local area network (WLAN) technology, Wi-Fi technology, Bluetooth technology, cellular technology, or satellite technology.

11. A wireless sonar system comprising:
a wireless sonar transducer configured to receive sonar returns from an underwater environment as first sonar return data, convert the first sonar return data into first sonar image data, and wirelessly transmit the first sonar image data;
a wireless sonar receiver comprising:
a wireless receiver configured to wirelessly receive the first sonar image data from a wireless sonar transducer;
a receiver processor;
a receiver memory having computer program code stored thereon, the receiver memory and the computer program code configured to, with the receiver processor, cause the wireless sonar receiver to:
convert the first sonar image data to second sonar return data, wherein the second sonar return data corresponds to the sonar returns received by the wireless transducer; and
an output port configured to attach to an input port of a marine electronic device and transmit the second sonar return data; and
the marine electronic device comprising:
a processor; and
a memory having computer program code stored thereon, the memory and the computer program code configured to, with the processor, cause the marine electronic device to:
receive the second sonar return data from the wireless sonar receiver; and
process the second sonar return data to generate second sonar image data and at least one sonar image from the second sonar image data for display on a user interface.

12. The wireless sonar system of claim 11, wherein the second sonar return data is substantially similar to the first sonar return data.

13. The wireless sonar system of claim 11, wherein converting the first sonar image data to the second sonar return data comprises converting the first sonar image data back into the first sonar return data.

14. The wireless sonar system of claim 11, wherein the output port is configured to be physically coupled to a marine electronic device adapter, wherein the marine electronic device adapter comprises a first end configured to mate with the output port and a second end configured to mate with an input port on the marine electronic device.

15. The wireless sonar system of claim 14, wherein the second end and the input port comprise pin connectors.

16. The wireless sonar system of claim 14, wherein the first end and the output port comprise universal serial bus (USB) connectors.

17. The wireless sonar system of claim 11, wherein the wireless sonar receiver further comprises:
a digital to analog converter, wherein the digital to analog converter is configured to receive the first sonar image data or the second sonar return data as a digital signal and convert the first sonar image data or the second sonar-return-signal to an analog signal.

18. The wireless sonar system of claim 11, wherein the wireless sonar receiver is configured to be physically coupled to a sonar input port of the marine electronic device.

19. The wireless sonar system of claim 11, wherein the wireless sonar receiver is configured to be removably coupled to a sonar input port of the marine electronic device.

20. The wireless sonar system of claim 11, wherein the wireless sonar receiver is configured to receive the first sonar image data from the wireless sonar transducer using wireless local area network (WLAN) technology, Wi-Fi technology, Bluetooth technology, cellular technology, or satellite technology.

\* \* \* \* \*